US012233857B2

(12) United States Patent
Srinivasan et al.

(10) Patent No.: US 12,233,857 B2
(45) Date of Patent: Feb. 25, 2025

(54) OBSTACLE AVOIDANCE FOR VEHICLE (71) Applicant: Ford Global Technologies, LLC, Dearborn, MI (US)

(72) Inventors: Mohit Srinivasan, Ann Arbor, MI (US); Hongtei Eric Tseng, Canton, MI (US); Michael Hafner, San Carlos, CA (US); Mrdjan J. Jankovic, Birmingham, MI (US); Abhishek Sharma, West Bloomfield, MI (US); Erol Dogan Sumer, Ann Arbor, MI (US); Alexander Jaeckel, Ann Arbor, MI (US); Aakar Mehra, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

(21) Appl. No.: 17/818,724

(22) Filed: Aug. 10, 2022

(65) Prior Publication Data
US 2024/0051523 A1 Feb. 15, 2024

(51) Int. Cl.
*B60W 30/09* (2012.01)
(52) U.S. Cl.
CPC ......... *B60W 30/09* (2013.01); *B60W 2520/06* (2013.01); *B60W 2710/18* (2013.01)
(58) Field of Classification Search
CPC ............. B60W 30/09; B60W 2520/06; B60W 2710/18
See application file for complete search history.

(56) References Cited

U.S. PATENT DOCUMENTS

| 3,846,749 | A | * | 11/1974 | Curry | B60Q 1/444 340/467 |
| 5,173,859 | A | * | 12/1992 | Deering | B60T 7/22 180/271 |
| 9,734,719 | B2 | * | 8/2017 | Flehmig | G08G 1/167 |
| 11,355,011 | B1 | * | 6/2022 | Khmelev | G08G 1/0129 |
| 2014/0025267 | A1 | * | 1/2014 | Tezuka | B60W 30/18027 701/51 |

(Continued)

FOREIGN PATENT DOCUMENTS

| CN | 111231956 A | 6/2020 |
| CN | 111897213 A | 11/2020 |

OTHER PUBLICATIONS

Chen et al., "Obstacle Avoidance for Low-Speed Autonomous Vehicles With Barrier Function", Control Systems Technology, IEEE Transactions Feb. 2017, DOI: 10.1109/TCST.2017.2654063.

(Continued)

*Primary Examiner* — Dale W Hilgendorf
*Assistant Examiner* — Hana Lee
(74) *Attorney, Agent, or Firm* — Frank A. MacKenzie; Brooks Kushman P.C.

(57) ABSTRACT

A computer includes a processor and a memory, the memory storing instructions executable by the processor to receive sensor data indicating an obstacle, formulate a control barrier function for a vehicle based on the sensor data, determine a control input based on the control barrier function, and actuate a component of the vehicle according to the control input. The control barrier function is defined with respect to a reference point that is spaced from a centroid of the vehicle.

18 Claims, 3 Drawing Sheets

(56) References Cited

U.S. PATENT DOCUMENTS

| | | | |
|---|---|---|---|
| 2015/0066349 A1* | 3/2015 | Chan | G01C 21/3697 |
| | | | 701/400 |
| 2017/0269602 A1* | 9/2017 | Nakamura | G01C 21/3492 |
| 2020/0369264 A1* | 11/2020 | Cheon | B60W 30/0953 |
| 2021/0171063 A1* | 6/2021 | Park | B60W 30/09 |
| 2021/0365596 A1 | 11/2021 | Heersink et al. | |

OTHER PUBLICATIONS

Zeng et al., "Safety-Critical Model Predictive Control with Discrete-Time Control Barrier Function", arXiv:2007.11718v3 [eess.SY] Mar. 23, 2021.

\* cited by examiner

OBSTACLE AVOIDANCE FOR VEHICLE

BACKGROUND

Advanced driver assistance systems (ADAS) are groups of electronic technologies that assist drivers in driving and parking functions. Examples of ADAS include forward collision warning, lane-departure warning, blind-spot warning, automatic emergency braking, adaptive cruise control, and lane-keeping assistance.

DETAILED DESCRIPTION

The techniques described herein may prevent contact between an obstacle and a vehicle by actuating a component of the vehicle, e.g., autonomous operation or ADAS functions. For example, the system can actuate the vehicle, e.g., a brake system or steering system, to avoid the obstacle entering a buffer zone surrounding the vehicle. The buffer zone can be represented by a control barrier function. For example, a computer can receive sensor data indicating an obstacle, formulate a control barrier function for a vehicle based on the sensor data, determine a control input based on the control barrier function, and actuate a component of the vehicle according to the control input. The control barrier function is defined with respect to a reference point that is spaced from a centroid of the vehicle. For example, the location of the reference point may change depending on whether the vehicle is in forward or reverse, e.g., may be located toward a front of the vehicle when the vehicle is in reverse and may be located toward a rear of the vehicle when the vehicle is in forward. The shifting location of the reference point may make the system more robust at detecting potential impacts to the sides of the vehicle. For another example, the reference point may be in a footprint of an extension of the vehicle, e.g., a side-view mirror, a bicycle rack, etc. This location for the reference point may make the system more effective at detecting potential impacts to the extension. Thus, the system may be more effective at actuating the vehicle to avoid low-speed impacts.

A computer includes a processor and a memory, and the memory stores instructions executable by the processor to receive sensor data indicating an obstacle, formulate a control barrier function for a vehicle based on the sensor data, determine a control input based on the control barrier function, and actuate a component of the vehicle according to the control input. The control barrier function is defined with respect to a reference point that is spaced from a centroid of the vehicle.

The control barrier function may be a difference between a distance from the reference point to the obstacle and a distance from the reference point to a point on a virtual boundary in a direction from the reference point to the obstacle.

The reference point may be inside a footprint of the vehicle.

The instructions may further include instructions to determine the reference point based on whether the vehicle is in forward or reverse. The reference point may be in front of the centroid when the vehicle is in reverse, and the reference point may be behind the centroid when the vehicle is in forward. The reference point may be between a front axle and front bumper of the vehicle along a length of the vehicle when the vehicle is in reverse, and the reference point may be between a rear axle and rear bumper of the vehicle along the length of the vehicle when the vehicle is in forward.

The control barrier function may be a difference between a distance from the reference point to the obstacle and a distance from the reference point to a point on a virtual boundary in a direction from the reference point to the obstacle, and the virtual boundary may be the same when the vehicle is in forward and in reverse.

The reference point may be laterally centered with respect to the vehicle when the vehicle is in forward and when the vehicle is in reverse.

The vehicle may include an extension extending outward from a body of the vehicle, and the reference point may be in a footprint of the extension. The control barrier function may be a difference between a distance from the reference point to the obstacle and a distance from the reference point to a point on a virtual boundary in a direction from the reference point to the obstacle, and the virtual boundary may extend around the footprint of the extension. At least a portion of a footprint of the body may be outside the virtual boundary.

The control barrier function may be a second control barrier function, the reference point may be a second reference point, the instructions may further include instructions to formulate a first control barrier function for a vehicle based on the sensor data, the first control barrier function may be defined with respect to a first reference point that is within a footprint of the body, and determining the control input may be based on the first control barrier function.

The component of the vehicle may include a brake system.

Determining the control input may be based on minimizing a function of a difference between the control input and a nominal input. The nominal input may be a current value of input.

The instructions may further include instructions to receive the nominal input from an algorithm for autonomous operation of the vehicle.

Determining the control input may be subject to a constraint based on the control barrier function. The constraint may be that a sum of a time derivative of the control barrier function and a function of the control barrier function exceeds a first value.

The constraint may be a first constraint, the control input may be subject to a second constraint, and the second constraint may be that the control input is below a maximum value.

A method includes receiving sensor data indicating an obstacle, formulating a control barrier function for a vehicle based on the sensor data, determining a control input based on the control barrier function, and actuating a component of the vehicle according to the control input. The control barrier function is defined with respect to a reference point that is spaced from a centroid of the vehicle.

With reference to the Figures, wherein like numerals indicate like parts throughout the several views, a computer 105 includes a processor and a memory, the memory storing instructions executable by the processor to receive sensor data indicating an obstacle 230, formulate a control barrier function for a vehicle 100 based on the sensor data, determine a control input based on the control barrier function, and actuate a component of the vehicle 100 according to the control input. The control barrier function is defined with respect to a reference point 235, 240 that is spaced from a centroid 245 of the vehicle 100.

Figure 1:
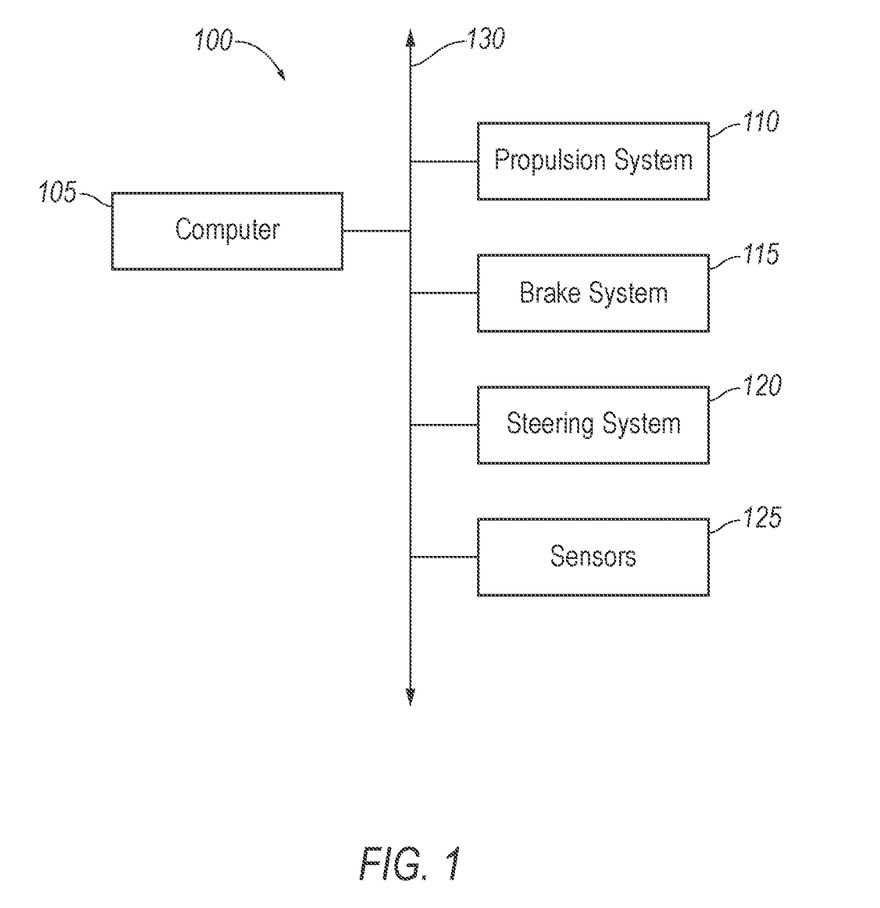
FIG. 1 is a block diagram of an example vehicle.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous vehicle. The computer 105 can be programmed to operate the vehicle 100 independently of the intervention of a human operator, completely or to a lesser degree. The computer 105 may be programmed to operate a propulsion system 110, a brake system 115, a steering system 120, and/or other vehicle systems based on data received from sensors 125. For the purposes of this disclosure, autonomous operation means the computer 105 controls the propulsion system 110, brake system 115, and steering system 120 without input from a human operator; semi-autonomous operation means the computer 105 controls one or two of the propulsion system 110, brake system 115, and steering system 120 and a human operator controls the remainder; and nonautonomous operation means a human operator controls the propulsion system 110, brake system 115, and steering system 120.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through a communications network 130 such as a controller area network (CAN) bus, Ethernet, WiFi, Local Interconnect Network (LIN), onboard diagnostics connector (OBD-II), and/or by any other wired or wireless communications network. The computer 105 may be communicatively coupled to the propulsion system 110, the brake system 115, the steering system 120, the sensors 125, and other components via the communications network 130.

The propulsion system 110 of the vehicle 100 generates energy and translates the energy into motion of the vehicle 100. The propulsion system 110 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 110 can include an electronic control unit (ECU) or the like that is in communication with and receives input from the computer 105 and/or a human operator. The human operator may control the propulsion system 110 via, e.g., an accelerator pedal and/or a gear-shift lever.

The vehicle 100, in particular the propulsion system 110, may be switchable between forward, reverse, and other states (e.g., gears) such as neutral and park. If the vehicle 100 is in forward, then acceleration will cause the vehicle 100 to travel forward, and if the vehicle 100 is in reverse, then acceleration will cause the vehicle 100 to travel backward. The propulsion system 110 may receive a selection of forward, reverse, or a different state from the computer 105 if the vehicle 100 is operating autonomously or from the gear-shift lever if the vehicle 100 is operating nonautonomously.

The brake system 115 is typically a conventional vehicle braking subsystem and resists the motion of the vehicle 100 to thereby slow and/or stop the vehicle 100. The brake system 115 may include friction brakes such as disc brakes, drum brakes, band brakes, etc.; regenerative brakes; any other suitable type of brakes; or a combination. The brake system 115 can include an electronic control unit (ECU) or the like that is in communication with and receives input from the computer 105 and/or a human operator. The human operator may control the brake system 115 via, e.g., a brake pedal.

The steering system 120 is typically a conventional vehicle steering subsystem and controls the turning of the wheels. The steering system 120 may be a rack-and-pinion system with electric power-assisted steering, a steer-by-wire system, as both are known, or any other suitable system. The steering system 120 can include an electronic control unit (ECU) or the like that is in communication with and receives input from the computer 105 and/or a human operator. The human operator may control the steering system 120 via, e.g., a steering wheel.

The sensors 125 may provide data about operation of the vehicle 100, for example, wheel speed, wheel orientation, and engine and transmission data (e.g., temperature, fuel consumption, etc.). The sensors 125 may detect the location and/or orientation of the vehicle 100. For example, the sensors 125 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 125 may detect the external world, e.g., objects and/or characteristics of surroundings of the vehicle 100, such as other vehicles, road lane markings, traffic lights and/or signs, pedestrians, etc. For example, the sensors 125 may include radar sensors, ultrasonic sensors, scanning laser range finders, light detection and ranging (lidar) devices, and image processing sensors such as cameras.

Figure 2:
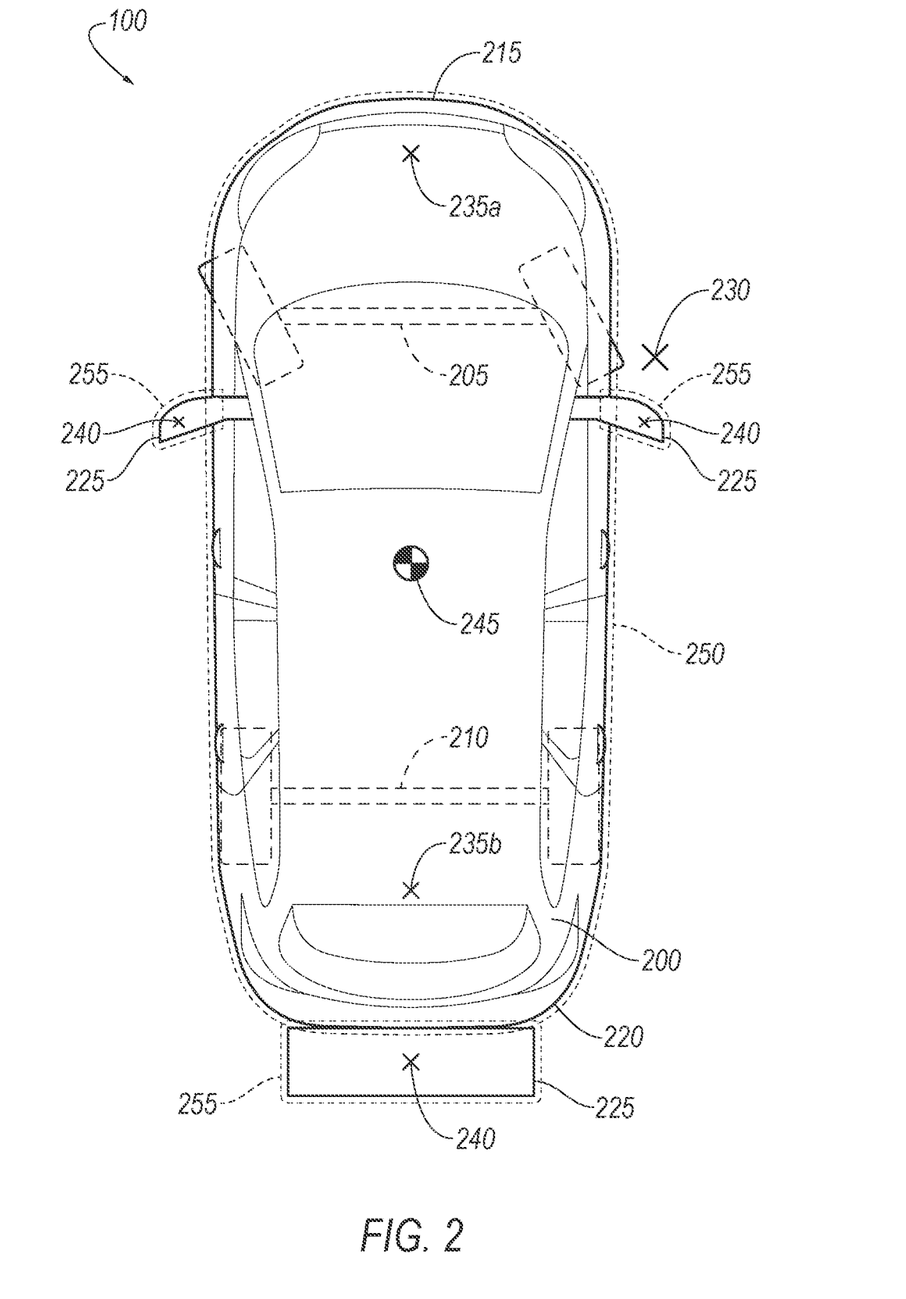
FIG. 2 is a diagrammatic top view of the vehicle with example obstacles.

With reference to FIG. 2, the computer 105 can be programmed to determine a vehicle kinematic state of the vehicle 100. For the purposes of this disclosure, a "kinematic state" is defined as a mathematical description of the position and/or motion of an entity. For example, the vehicle kinematic state can include a position, a heading, a velocity vector, and a yaw rate. The position of the vehicle 100 can be the position of a vehicle reference point 235 of the vehicle 100. (FIG. 2 shows two possible vehicle references points 235a,b, as will be explained below.) The components of the velocity vector of the vehicle 100 can be given by the following equations:

$$\dot{x}_H = v_H \cos \theta_H$$

$$\dot{y}_H = v_H \sin \theta_H$$

in which ($x_H$, $y_H$) is the position of the vehicle 100, the dot above a variable indicates a time derivative, $v_H$ is the longitudinal velocity, i.e., speed, of the vehicle 100, and $\theta_H$ is the heading of the vehicle 100. The yaw rate of the vehicle 100 can be given by the following equation:

$$\dot{\theta}_H = \omega_H = \frac{v_H \tan \delta}{W}$$

in which $\delta$ is the steering angle of the vehicle 100 and W is the wheelbase of the vehicle 100, i.e., the longitudinal distance between a front axle 205 and a rear axle 210.

The computer 105 can be programmed to determine the vehicle kinematic state based on sensor data from the sensors 125. For example, the sensors 125 can return the position from a GPS sensor, the speed $v_H$ of the vehicle 100 from wheel speed sensors, the heading $\theta_H$ of the vehicle 100 from an IMU, and the steering angle $\delta$ from the steering system 120.

The computer 105 can be programmed to determine the vehicle reference point 235. The vehicle reference point 235 may be inside a footprint of the vehicle 100, i.e., spaced from a boundary of the footprint toward an interior of the footprint, e.g., inside a footprint of a body 200 of the vehicle 100. For the purposes of this disclosure, a "footprint" of an object is defined as a horizontal area occupied by the object. The vehicle reference point 235 is spaced from the centroid 245. The term "centroid" is used in the customary sense of a geometric center of an object, i.e., an arithmetic mean of all points of the object. The vehicle reference point 235 may be laterally centered with respect to the vehicle 100, i.e., positioned on a longitudinal midline of the vehicle 100. The computer 105 may determine the vehicle reference point 235 based on whether the vehicle 100 is in forward or reverse. The computer 105 may store two vehicle-reference-point options in memory and select the vehicle reference point 235 from the vehicle-reference-point options based on whether the vehicle 100 is in forward or reverse, i.e., select one vehicle-reference-point option as the vehicle reference point 235 when the vehicle 100 is in reverse and select the other vehicle-reference-point option as the vehicle reference point 235 when the vehicle 100 is in forward. For example, the vehicle reference point 235 may be in front of the centroid 245 when the vehicle 100 is in reverse (labeled as 235a in FIG. 2), and the vehicle reference point 235 may be behind the centroid 245 when the vehicle 100 is in forward (labeled as 235b). More specifically, the vehicle reference point 235 may be between the front axle 205 and a front bumper 215 of the vehicle 100 along a length of the vehicle 100 when the vehicle 100 is in reverse, and the vehicle reference point 235 may be between the rear axle 210 and a rear bumper 220 of the vehicle 100 along the length of the vehicle 100 when the vehicle 100 is in forward.

The vehicle 100 may include one or more extensions 225 extending outward from the body 200. The extensions 225 are physical structures distinct from the body 200 that are attached to the body 200, e.g., rigidly fixed to the body 200. The extensions 225 are positioned at least partially outside the footprint of the body 200. For example, the extensions 225 may include side-view mirrors, a bicycle rack, a tow hitch, a snowplow, a storage container or rack, etc.

The computer 105 can be programmed to determine an extension kinematic state of each of one or more of the extensions 225. For example, the extension kinematic state of an extension 225 can include a position, a heading, a velocity vector, and a yaw rate. The position of the extension 225 can be the position of an extension reference point 240 of the extension 225. The extension kinematic state can be dependent on the vehicle kinematic state. For example, the speed $v_E$ of the extension 225 can be a function of the speed $v_H$ and yaw rate $W_H$ of the vehicle 100, and the heading $\theta_E$ of the extension 225 can be a function of the speed $v_H$, heading $\theta_H$, and yaw rate $\omega_H$ of the vehicle 100, e.g., according to known geometric relationships. The yaw rate of the extension 225 can be a function of the speed $v_H$ of the vehicle 100, the yaw rate $\theta_H$ of the vehicle 100, and the position of the extension 225 relative to the centroid 245 of the vehicle 100.

The computer 105 can be programmed to determine the extension reference point 240. For example, the position of the extension reference point 240 can be a fixed distance from the centroid 245 of the vehicle 100 and a fixed direction relative to the heading of the vehicle 100 from the centroid 245 of the vehicle 100. The extension reference point 240 may be inside the footprint of the vehicle 100, e.g., inside a footprint of the extension 225, i.e., spaced from a boundary of the footprint of the extension 225 toward an interior of the footprint of the extension 225. The extension reference point 240 is spaced from the centroid 245 of the vehicle 100, e.g., is outside the footprint of the body 200 of the vehicle 100. For example, the extension reference point 240 may be at a centroid of the extension 225 or at a centroid of a portion of the extension 225 that is outside the footprint of the body 200 of the vehicle 100.

The computer 105 can be programmed to actuate a component of the vehicle 100 according to an input. For the purposes of this disclosure, an "input" is one or more values that control operation of a component of the vehicle 100. For example, the component can be the brake system 115, and the input can include the speed $v_H$ of the vehicle 100. Actuating the brake system 115 according to the input of the speed $v_H$ of the vehicle 100 can include engaging the brake system 115 until the speed $v_H$ drops to the speed $v_H$ specified in the input. For another example, the component can be the steering system 120, and the input can include the steering angle $\delta$. Actuating the steering system 120 according to the input of the steering angle $\delta$ can include turning the wheels until the wheels are oriented at the steering angle $\delta$.

The computer 105 can be programmed to receive a nominal input. The nominal input can be a current value of the input. For example, if an operator is manually operating the vehicle 100, the nominal input can be the current values of the values forming the input, e.g., current values of the speed $v_H$ of the vehicle 100 and/or the steering angle $\delta$. For another example, if the computer 105 is operating the vehicle 100 autonomously, the nominal input can be values commanded by an algorithm for autonomous operation of the vehicle 100. The computer 105 can receive the nominal input from the algorithm. In the absence of a control input (determined as will be described below), the computer 105 can be programmed to actuate the components of the vehicle 100 according to the nominal input.

The computer 105 can be programmed to receive sensor data from the sensors 125 indicating one or more obstacles 230. The sensor data can include positions, headings, velocity vectors, and/or contours of the obstacles 230. In other words, the sensor data can define an obstacle kinematic state. For example, the position of the obstacle 230 can be represented as a distance $r_H$ from the vehicle reference point 235 of the vehicle 100 to the obstacle 230 and a direction $\theta_{HO}$ from the vehicle reference point 235 of the vehicle 100 to the obstacle 230, and/or the position of the obstacle 230 can be represented as a distance $r_E$ from the extension reference point 240 of the extension 225 and a direction $\theta_{EO}$ from the extension reference point 240 of the extension 225 to the obstacle 230. The velocity vector can be represented by a speed $v_O$ of the obstacle 230 and a heading $\theta_O$ of the obstacle 230.

The computer 105 can be programmed to formulate a vehicle control barrier function $h_H$ for the vehicle 100 based on the sensor data, i.e., based on the obstacle 230. The vehicle control barrier function $h_H$ is defined with respect to the vehicle reference point 235. For example, the computer 105 may store multiple vehicle control barrier functions $h_H$, e.g., one for each vehicle-reference-point option. The computer 105 may load and then use the vehicle control barrier function $h_H$ associated with the vehicle-reference-point option selected as the vehicle reference point 235. The vehicle control barrier function $h_H$ can include a difference between the distance $r_H$ from the vehicle reference point 235 of the vehicle 100 to the obstacle 230 and a point on a vehicle virtual boundary 250 in the direction $\theta_{HO}$ from the vehicle reference point 235 of the vehicle 100 to the obstacle 230. The vehicle control barrier function $h_H$ can include that difference summed with a term indicating the relative movement of the vehicle 100 and the obstacle 230. The term can be a function of a relative speed $\dot{r}_H$ of the vehicle 100 and the obstacle 230 and of the maximum deceleration d of which the vehicle 100 is capable. The vehicle virtual boundary 250 can be represented as a function $\Gamma_H$ of the direction $\theta_{HO}$ that returns a distance from the vehicle reference point 235 of the vehicle 100 in the direction $\theta_{HO}$ to the vehicle virtual boundary 250. The vehicle control barrier function $h_H$ can be a function of the vehicle kinematic state and the obstacle kinematic state. The vehicle control barrier function $h_H$ need not be a function of the extension kinematic state. For example, the vehicle control barrier function $h_H$ can be represented by the following equation:

$$h_H(r_H, \theta_H, \theta_{HO}, \theta_O, v_H, v_O) = r_H - \Gamma_H(\theta_{HO}) + \text{sgn}(\dot{r}_H)\frac{\dot{r}_H^2}{2d}$$

in which sgn(·) indicates the sign of the argument, i.e., whether the argument is positive or negative.

The vehicle virtual boundary 250 may extend around the footprint of the body 200 of the vehicle 100. For example, the vehicle virtual boundary 250 may follow an outer edge of the footprint of the body 200, or the vehicle virtual boundary 250 may be spaced by a buffer distance from the footprint of the body 200 outside the footprint of the body 200. The vehicle virtual boundary 250 may be the same when the vehicle 100 is in forward and in reverse. For example, the computer 105 may store multiple functions $\Gamma_H$ for the vehicle virtual boundary 250, e.g., one for each vehicle-reference-point option, e.g., as parts of the stored vehicle control barrier functions $h_H$. The functions $\Gamma_H$ for the vehicle virtual boundaries may describe the same shape and may be offset longitudinally by the distance between the vehicle-reference-point options. The computer 105 may load and then use the function $\Gamma_H$ for the vehicle virtual boundary 250 associated with the vehicle-reference-point option selected as the vehicle reference point 235, e.g., as a consequence of loading the vehicle control barrier function $h_H$.

The computer 105 can be programmed to formulate an extension control barrier function $h_E$ for each extension 225 based on the sensor data, i.e., based on the obstacle 230. The extension control barrier function $h_E$ is defined with respect to the extension reference point 240. The extension control barrier function $h_E$ can include a difference between the distance $r_E$ from the extension reference point 240 of the extension 225 to the obstacle 230 and a point on an extension virtual boundary 255 in the direction $\theta_{EO}$ from the extension reference point 240 of the extension 225 to the obstacle 230. The extension control barrier function $h_E$ can include that difference summed with a term indicating the relative movement of the extension 225 and the obstacle 230. The term can be a function of a relative speed $\dot{r}_E$ of the extension 225 and the obstacle 230 and of the maximum deceleration d of which the vehicle 100 is capable. The maximum deceleration d is a physical parameter of the vehicle 100, e.g., of the brake system 115. The extension virtual boundary 255 can be represented as a function $\Gamma_E$ of the direction $\theta_{EO}$ that returns a distance from the extension reference point 240 of the extension 225 in the direction $\theta_{EO}$ to the extension virtual boundary 255. The extension control barrier function $h_E$ can be a function of the extension kinematic state and the obstacle kinematic state. The extension control barrier function $h_E$ need not be a direct function of the vehicle kinematic state. For example, the extension control barrier function $h_E$ can be represented by the following equation:

$$h_E(r_E, \theta_E, \theta_{EO}, \theta_O, v_E, v_O) = r_E - \Gamma_E(\theta_{EO}) + \text{sgn}(\dot{r}_E)\frac{\dot{r}_E^2}{2d}$$

The extension virtual boundary 255 may extend around the footprint of the extension 225 or a footprint of a portion of the extension 225 outside the footprint of the body 200. For example, the extension virtual boundary 255 may follow an outer edge of the footprint of the extension 225, or the extension virtual boundary 255 may be spaced by a buffer distance from the footprint of the extension 225 outside the footprint of the extension 225. The extension virtual boundary 255 may encompass a portion of the footprint of the body 200, but at least a portion of the footprint of the body 200, e.g., a majority of the area of the footprint of the body 200, is outside the extension virtual boundary 255, as the extension virtual boundary 255 provides coverage in conjunction with the coverage provided by the vehicle virtual boundary 250.

The control barrier functions $h_H$, $h_E$ provide a computationally efficient manner for the computer 105 to determine the control input, described below. For example, the computer 105 can determine constraints based on the control barrier functions and solve an optimization problem subject to the constraints using a quadratic program, as will be described in turn. Quadratic programming is an efficient technique for solving the optimization problem, and the use of the control barrier functions permits formulation of the optimization problem in the manner required for quadratic programming.

The determinations of the vehicle reference point 235 and the extension reference points 240 may be subject to a reference-point constraint based on the vehicle virtual boundary 250. The reference-point constraint may be that if the change in the distance from the vehicle virtual boundary 250 to the obstacle 230 measured along a line from the centroid 245 is decreasing, then the change in the distance from the determined vehicle reference point 235 or extension reference point 240 must be decreasing as well, e.g., as represented by this expression:

$$\dot{r} - \dot{\Gamma}(\theta_{CO}) < 0 \Rightarrow \dot{r}_i < 0$$

in which r is the distance from the centroid 245 to the obstacle 230, $\theta_{CO}$ is the direction from the centroid 245 to the obstacle 230, $\Gamma$ is a function representing the vehicle virtual boundary 250 when the centroid 245 is used as the vehicle reference point 235, and $r_i$ is the distance from the vehicle reference point 235 to the obstacle 230 or from the extension reference point 240 to the obstacle 230. The reference-point constraint may help ensure that the vehicle control barrier function $h_H$ or the extension control barrier function $h_E$ decreases monotonically as the obstacle 230 moves closer to the vehicle 100

Determining the control input (described below) can be subject to a first constraint based on the vehicle control barrier function $h_H$. The first constraint can be that a sum of a time derivative of the vehicle control barrier function $h_H$ and a first function $\alpha(\cdot)$ of the vehicle control barrier function $h_H$ exceeds a first value. The first value can be zero. For example, the first constraint can be represented by the following equation:

$$\dot{h}_H + \alpha(h_H) \geq 0$$

The first function $\alpha(\cdot)$ can be locally Lipschitz continuous, i.e., within a range of the first function $\alpha(\cdot)$ that is implicated by the first constraint, the absolute value of the slope between any two points is not greater than a predefined real number. In other words, there is a maximum rate of change of the first function $\alpha$ with respect to the first control barrier function $h_H$. The first function $\alpha(\cdot)$ can be a class $\kappa$ function, i.e., is strictly increasing and is equal to zero when the argument is zero, i.e., $\alpha(0)=0$. The first function $\alpha(\cdot)$ can be chosen to cause the component of the vehicle 100 to actuate in time to prevent the vehicle 100 from contacting the obstacle 230. For example, the first function $\alpha(h_H)$ can be a product of a parameter and the vehicle control barrier function $h_H$, i.e., $\alpha(h_H)=\lambda h_H$. The parameter can be chosen to control the sensitivity of the first constraint.

The shifting of the vehicle reference point 235 from which the vehicle control barrier function is defined may help the vehicle 100 avoid side impacts, i.e., avoid sideswiping an obstacle 230. In the example shown in FIG. 2, if the vehicle 100 is turning while traveling in reverse, the obstacle 230 is in a position that may impact the vehicle 100. With the vehicle reference point 235 in the forward position, the obstacle 230 will be approaching the vehicle reference point 235 as the vehicle 100 travels, causing the sum in the first constraint above to approach the first value and thus actuate the component of the vehicle 100. If the vehicle reference point 235 were instead located at the centroid 245, the obstacle 230 would appear to be moving away from the vehicle virtual boundary 250, meaning that the sum in the first constraint would not be approaching the first value and that the component may not be actuated. An equivalent benefit may be achieved by the rearward position of the vehicle reference point 235 if the vehicle 100 is traveling forward. Forward and rear impacts (as opposed to side impacts) have the same effects whether the vehicle reference point 235 is located at the centroid 245 or is moved forward or rearward from the centroid 245 because an obstacle 230 that is in front of the front bumper 215 or behind the rear bumper 220 will approach the vehicle reference point 235 regardless of the longitudinal placement of the vehicle reference point 235. The vehicle virtual boundary 250 being the same regardless of the placement of the vehicle reference point 235 helps achieve that result.

Determining the control input (described below) can be subject to one or more second constraints based on the extension control barrier functions $h_E$ for the one or more extensions 225. Each second constraint can be that a sum of a time derivative of the extension control barrier function $h_E$ and a second function $\alpha(\cdot)$ of the extension control barrier function $h_E$ exceeds a second value. The second value can be zero. For example, the second constraint can be represented by the following equation:

$$\dot{h}_E + \alpha(h_E) \geq 0$$

The first function and the second function can be the same, and are herein both represented by $\alpha(\cdot)$. The second function $\alpha(\cdot)$ can be locally Lipschitz continuous, i.e., within a range of the second function $\alpha(\cdot)$ that is implicated by the second constraint, the absolute value of the slope between any two points is not greater than a predefined real number. In other words, there is a maximum rate of change of the second function $\alpha$ with respect to the extension control barrier function $h_E$. The second function $\alpha(\cdot)$ can be a class $\kappa$ function, i.e., is strictly increasing and is equal to zero when the argument is zero, i.e., $\alpha(0)=0$. The second function $\alpha(\cdot)$ can be chosen to cause the component of the vehicle 100 to actuate in time to prevent the extension 225 from contacting the obstacle 230. For example, the second function $\alpha(h_H)$ can be a product of a parameter and the extension control barrier function $h_E$, i.e., $\alpha(h_E)=\lambda h_E$. The parameter can be chosen to control the sensitivity of the second constraint.

The use of the second constraint distinct from the first constraint may prevent impacts to the extensions 225 compared with using a single constraint based on a control barrier function covering an entirety of the footprint of the vehicle 100, i.e., a footprint including the extensions 225. The second constraint can use the extension control barrier function defined by the extension reference point 240. Because the extensions 225 extend outward from the body 200, it is possible for an obstacle 230 to be moving away from the centroid 245 while still moving toward the extension reference point 240. The second constraint captures these situations and may cause actuation of the component of the vehicle 100 while a single constraint may not.

Determining the control input (described below) can be subject to a third constraint. The third constraint can be that the control input is below a maximum value, e.g., as represented by the following equation:

$$|u| \leq u_{max}$$

in which u is the control input and $u_{max}$ is the maximum value. The maximum value $u_{max}$ can be chosen based on the capabilities of the component of the vehicle 100 that is controlled by the input, e.g., the brake system 115 and/or the steering system 120.

The computer 105 can be programmed to determine the control input u based on the vehicle control barrier function $h_H$ and the extension control barrier function $h_E$. For example, determining the control input u can include minimizing a function of a difference between the control input u and the nominal input $u_{nom}$. For example, determining the control input u can include solving a quadratic program based on the vehicle control barrier function $h_H$ and the extension control barrier functions $h_E$, e.g., subject to the first and second constraints. Quadratic programming means solving optimization problems formulated as quadratic functions. For example, solving the quadratic program can include minimizing a square of the difference between the control input u and the nominal input $u_{nom}$ subject to the first, second, and third constraints above, e.g., as represented by the following formula:

$$\min_{u \in \mathbb{R}^m} \|u - u_{nom}\|_2^2$$

in which $\mathbb{R}^m$ is the set of m-length vectors of real numbers. For example, if the control input u includes the speed $v_H$ of the vehicle 100 and the steering angle δ, then the length m of the vector of the control input u is 2.

In the event of multiple obstacles 230, the computer 105 can be programmed to determine the control input u based on the vehicle control barrier function $h_H$ and the extension control barrier functions $h_E$ for all or a subset of the obstacles 230. For example, if three obstacles 230 are present, determining the control input u can include solving a quadratic program as described above subject to three first constraints (one for each obstacle 230), three second constraints per extension 225 (one for each obstacle 230 and extension 225), and the third constraint.

The computer 105 can be programmed to actuate the component of the vehicle 100, e.g., the brake system 115 and/or steering system 120, according to the control input u. For example, the computer 105 can be programmed to actuate the component according to the control input u in response to the computer 105 determining the control input u and to actuate the component according to the nominal input $u_{nom}$ otherwise.

Figure 3:
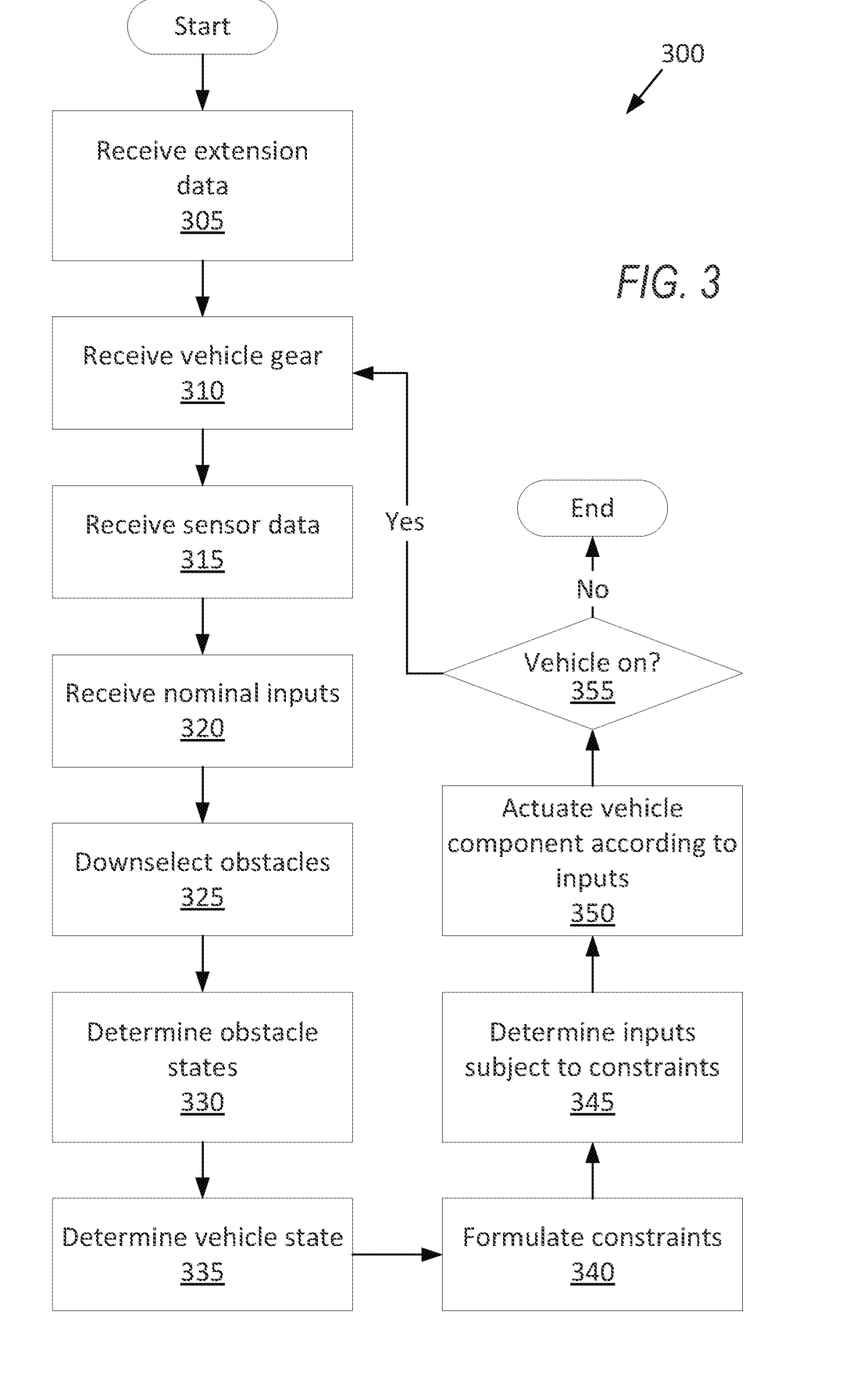
FIG. 3 is a process flow diagram of an example process for controlling the vehicle.

FIG. 3 is a process flow diagram illustrating an example process 300 for controlling the vehicle 100. The memory of the computer 105 stores executable instructions for performing the steps of the process 300 and/or programming can be implemented in structures such as mentioned above. The process 300 may begin upon the vehicle 100 being turned on. As a general overview of the process 300, the computer 105 receives data indicating the extensions 225, receives an indication of whether the vehicle 100 is in forward or reverse, receives data from the sensors 125, receives the nominal input $u_{nom}$, downselects the obstacles 230 present in the sensor data, determines the obstacle kinematic states, determines the vehicle kinematic state and extension kinematic states, formulates the first and second constraints, solves the quadratic program for the control input u subject to the constraints, and actuates the component of the vehicle 100 according to the control input u. The process 300 can continue for as long as the vehicle 100 remains on; i.e., the computer 105 repeatedly performs these steps while the vehicle 100 remains on.

The process 300 begins in a block 305, in which the computer 105 receives data indicating the extensions 225, e.g., indicating the extension reference points 240 and the extension virtual boundaries. For example, the computer 105 may receive an input including a shape of the extension virtual boundary 255 and a relative position of the extension virtual boundary 255 with respect to the vehicle 100, e.g., to the centroid 245. The computer 105 may then determine the extension reference point 240, e.g., by calculating a centroid of the extension virtual boundary 255. For another example, the computer 105 may load the extension reference points 240 and the extension virtual boundaries from memory, e.g., for extensions 225 that are present by default such as side-view mirrors. For another example, the computer 105 may receive an input indicating a presence or absence of one or more of the extensions 225, and the computer 105 may, if an extension 225 is present, load the extension reference point 240 and the extension virtual boundary 255 from memory; e.g., an occupant may provide an input that a bicycle rack has been attached to the body 200 of the vehicle 100.

Next, in a block 310, the computer 105 receives an indication of whether the vehicle 100 is in forward or reverse, e.g., a gear of the vehicle 100, e.g., from the propulsion system 110 over the communications network 130.

Next, in a block 315, the computer 105 receives the sensor data from the sensors 125 indicating the obstacles 230, as described above.

Next, in a block 320, the computer 105 receives the nominal input $u_{nom}$, as described above.

Next, in a block 325, the computer 105 downselects the obstacles 230 present in the sensor data, i.e., reduces the number of obstacles 230 under consideration. For the purposes of this disclosure, downselection is selecting a subset of items from a typically larger set of items. For example, the computer 105 can select the five closest obstacles 230 to the vehicle 100, e.g., with the smallest values for $r_H$ or r. For another example, the computer 105 can select the five closest obstacles 230 to the vehicle 100 and the five closest obstacles 230 to the extension 225, e.g., with the smallest values for $r_E$. The obstacles 230 closest to the vehicle 100 and to the extension 225 may overlap, so the downselection can result in five to ten obstacles 230 in this example. Downselection can save processing time for the computer 105 when combined with determining the control input u based on the vehicle control barrier function $h_H$ and the extension control barrier functions $h_E$ by capping the number of times that the control input u is solved for.

Next, in a block 330, the computer 105 determines the obstacle kinematic states for the downselected obstacles 230, as described above.

Next, in a block 335, the computer 105 determines the vehicle kinematic state and the extension kinematic states, as described above. The vehicle kinematic state may depend on whether the vehicle 100 is in forward or reverse, received in the block 310.

Next, in a block 340, for each downselected obstacle 230, the computer 105 formulates the vehicle control barrier function $h_H$ and the extension control barrier functions $h_E$, and the computer 105 determines the first and second constraints based on the control barrier functions $h_H$, $h_E$, as described above. The vehicle control barrier function $h_H$ may depend on whether the vehicle 100 is in forward or reverse, as described above.

Next, in a block 345, the computer 105 determines the control input u based on the vehicle control barrier function $h_H$ and the extension control barrier functions $h_E$ for the downselected obstacles 230, as described above.

Next, in a block 350, the computer 105 actuates the component of the vehicle 100, e.g., the brake system 115 and/or the steering system 120, according to the control input u, as described above, e.g., for the control input u having the most extreme value. The most extreme value of the control input u can correspond to the obstacle 230 needing to be avoided from among the downselected obstacles 230.

Next, in a decision block 355, the computer 105 determines whether the vehicle 100 is still on. If so, the process 300 returns to the block 310 to continue receiving the gear of the vehicle 100 and the sensor data. If not, the process 300 ends.

In general, the computing systems and/or devices described may employ any of a number of computer operating systems, including, but by no means limited to, versions and/or varieties of the Ford Sync® application, AppLink/Smart Device Link middleware, the Microsoft Automotive@ operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," "third" are used throughout this document as identifiers and are not intended to signify importance, order, or quantity. Terms such as "front," "forward," "back," "behind," "rearward," "left," "right," "lateral," etc., are understood relative to the vehicle. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive sensor data indicating an obstacle;
   determine a reference point that is spaced from a centroid of a vehicle based on whether the vehicle is in a forward gear or a reverse gear;
   formulate a control barrier function for the vehicle based on the sensor data, the control barrier function being defined with respect to the reference point;
   determine a control input based on the control barrier function, wherein determining the control input is subject to a constraint based on the control barrier function, the constraint being that a sum exceeds a first value, the sum being of a time derivative and a function, the time derivative being of the control barrier function, the function being of the control barrier function; and
   actuate a component of the vehicle according to the control input.

2. The computer of claim 1, wherein the control barrier function is a difference between a first distance and a second distance, the first distance is from the reference point to the obstacle, the second distance is from the reference point to a point on a virtual boundary, and the point on the virtual boundary is on a line from the reference point to the obstacle.

3. The computer of claim 1, wherein the reference point is inside a footprint of the vehicle.

4. The computer of claim 1, wherein the reference point is in front of the centroid when the vehicle is in the reverse gear, and the reference point is behind the centroid when the vehicle is in the forward gear.

5. The computer of claim 4, wherein the reference point is between a front axle and front bumper of the vehicle along a length of the vehicle when the vehicle is in the reverse gear, and the reference point is between a rear axle and rear bumper of the vehicle along the length of the vehicle when the vehicle is in the forward gear.

6. The computer of claim 1, wherein the control barrier function is a difference between a first distance and a second distance, the first distance is from the reference point to the obstacle, the second distance is from the reference point to a point on a virtual boundary, the point on the virtual boundary is on a line from the reference point to the obstacle, and the virtual boundary is the same when the vehicle is in the forward gear and in the reverse gear.

7. The computer of claim 1, wherein the reference point is laterally centered with respect to the vehicle when the vehicle is in the forward gear and when the vehicle is in the reverse gear.

8. The computer of claim 1, wherein the vehicle includes an extension extending outward from a body of the vehicle, and the reference point is in a footprint of the extension.

9. The computer of claim 8, wherein the control barrier function is a difference between a first distance and a second distance, the first distance is from the reference point to the obstacle, the second distance is from the reference point to a point on a virtual boundary, the point on the virtual boundary is on a line from the reference point to the obstacle, and the virtual boundary extends around the footprint of the extension.

10. The computer of claim 9, wherein the footprint is a first footprint, the body defines a second footprint, and at least a portion of the second footprint is outside the virtual boundary.

11. The computer of claim 8, wherein
the control barrier function is a second control barrier function;
the reference point is a second reference point;
the footprint is a first footprint;
the body defines a second footprint;
the instructions further include instructions to formulate a first control barrier function for the vehicle based on the sensor data, the first control barrier function being defined with respect to a first reference point that is within the second footprint; and
determining the control input is based on the first control barrier function.

12. The computer of claim 1, wherein the component of the vehicle includes a brake system.

13. The computer of claim 1, wherein determining the control input is based on minimizing a second function of a difference between the control input and a nominal input.

14. The computer of claim 13, wherein the nominal input is a current value of input.

15. The computer of claim 13, wherein the instructions further include instructions to receive the nominal input from an algorithm for autonomous operation of the vehicle.

16. The computer of claim 1, wherein the constraint is a first constraint, the control input is subject to a second constraint, and the second constraint is that the control input is below a maximum value.

17. The computer of claim 1, wherein the sensor data indicates a plurality of obstacles including the obstacle, the instructions further include instructions to:
downselect the obstacles to a subset; and
formulate respective control barrier functions for each obstacle in the subset.

18. A method comprising:
receiving sensor data indicating an obstacle;
determining a reference point that is spaced from a centroid of a vehicle based on whether the vehicle is in a forward gear or a reverse gear;
formulating a control barrier function for the vehicle based on the sensor data, the control barrier function being defined with respect to the reference point;
determining a control input based on the control barrier function, wherein determining the control input is subject to a constraint based on the control barrier function, the constraint being that a sum exceeds a first value, the sum being of a time derivative and a function, the time derivative being of the control barrier function, the function being of the control barrier function; and
actuating a component of the vehicle according to the control input.

* * * * *